US007404481B2

(12) United States Patent
Sandberg et al.

(10) Patent No.: US 7,404,481 B2
(45) Date of Patent: Jul. 29, 2008

(54) RETAINING PINS FOR STACKING CONVEYOR FOR SLICING MACHINE

(75) Inventors: Glenn Sandberg, New Lennox, IL (US); Glen F. Pryor, Tinley Park, IL (US)

(73) Assignee: Formax, Inc., Mokena, IL (US)

( * ) Notice: Subject to any disclaimer, the term of this patent is extended or adjusted under 35 U.S.C. 154(b) by 5 days.

(21) Appl. No.: 11/449,574

(22) Filed: Jun. 8, 2006

(65) Prior Publication Data

US 2006/0289281 A1 Dec. 28, 2006

Related U.S. Application Data

(60) Provisional application No. 60/689,452, filed on Jun. 10, 2005.

(51) Int. Cl.
*B65G 15/12* (2006.01)

(52) U.S. Cl. ...................... 198/809; 198/463.3; 99/386; 99/443 C

(58) Field of Classification Search ................. 198/809, 198/463.3; 99/386, 443 C
See application file for complete search history.

(56) References Cited

U.S. PATENT DOCUMENTS

| | | | | |
|---|---|---|---|---|
| 1,209,021 | A * | 12/1916 | Phillips | 198/586 |
| 2,627,159 | A * | 2/1953 | Russell | 56/364 |
| 3,737,021 | A * | 6/1973 | Reth et al. | 198/419.3 |
| 5,018,338 | A | 5/1991 | Jurchuk et al. | |
| 5,628,237 | A | 5/1997 | Lindee et al. | |
| 5,649,463 | A | 7/1997 | Lindee et al. | |
| 5,704,265 | A | 1/1998 | Johnson et al. | |
| 6,471,044 | B1 * | 10/2002 | Isaacs et al. | 198/809 |
| 6,484,615 | B2 | 11/2002 | Lindee | |
| 6,763,750 | B2 | 7/2004 | Lindee | |
| 6,845,860 | B1 * | 1/2005 | Walker | 198/433 |
| 7,114,608 | B2 * | 10/2006 | Brown et al. | 198/370.1 |

* cited by examiner

*Primary Examiner*—Mark A Deuble
(74) *Attorney, Agent, or Firm*—The Law Office of Randall T. Erickson, P.C.

(57) ABSTRACT

A stacking conveyor for receiving slices cut from a food loaf or slab includes a frame, an endless belt conveying surface, a carrier, a plurality of pins, and a motive mechanism. The endless belt conveying surface is supported by the frame. The carrier is arranged beneath the top surface of the endless belt conveying surface. The plurality of pins protrude upward from the carrier, each of the pins having a sharp top end. The motive mechanism is configured for raising the carrier to elevate the top ends of the pins above the top surface of the endless belt conveying surface to receive and impale a first slice of a stack. The pins are then retracted beneath the conveying surface.

18 Claims, 3 Drawing Sheets

RETAINING PINS FOR STACKING CONVEYOR FOR SLICING MACHINE

This application claims the benefit of U.S. Provisional Application Ser. No. 60/689,452 filed Jun. 10, 2005.

TECHNICAL FIELD OF THE INVENTION

The invention relates to conveyors for slicing machines, particularly to conveyors which accumulate slices in a stack.

BACKGROUND OF THE INVENTION

U.S. Pat. Nos. 5,649,463 and 5,704,265 describe high speed slicing machines having stacking conveyors that receive slices that are cut from a loaf. In a slicing machine operation, the slices fall onto the stacking conveyor and are formed into a stack, either a straight stack or a shingled stack. This stacking conveyor is sometimes referred to as a jump conveyor. The jump conveyor moves completed stacks from beneath the slicing blade onto a further conveyor to be conveyed eventually to a sorting and/or packaging operation. The jump conveyor can be provided with a vertical lift mechanism which allows the jump conveyor to descend as the stack is forming to ensure a constant drop distance from the loaf onto the preceding slice. The jump conveyor can be provided with a lateral movement means wherein stack corrections can be made or shingled stack patterns can be accumulated or product shuffled stacks can be created such as disclosed in U.S. Pat. No. 6,763,750.

The present inventors have recognized that sometimes the first slice that begins an accumulated stack does not land and remain in a desirable orientation or position on the conveyor surface. The first slice can slide or bounce somewhat or can be slightly folded on an edge, on the conveyor surface. The slices that follow the first slice however have the advantage of the propensity of the slices to adhere together and the aforementioned problems are reduced.

The present inventors have recognized that it would be desirable to provide a mechanism for ensuring that the first slice cut from a loaf and received on a stacking conveyor surface landed and was maintained in a flat, properly positioned orientation for receiving the second and subsequent slices thereon.

SUMMARY OF THE INVENTION

The invention provides a stacking conveyor for receiving slices cut from a food loaf or slab that includes a frame, an endless belt conveying surface, a carrier, a plurality of pins, and a motive mechanism. The endless belt conveying surface is supported by the frame. The carrier is arranged beneath the top surface of the endless belt conveying surface. The plurality of pins protrude upward from the carrier, each of the pins having a sharp top end. The motive mechanism is configured for raising the carrier to elevate the top ends of the pins above the top surface of the endless belt conveying surface.

Preferably the motive mechanism also acts to lower the carrier, although gravity or a spring could be used as well to create the lowering movement.

The motive mechanism can comprise an actuator, preferably a pneumatic cylinder, mounted to the frame and having a cylinder rod engaged to the carrier.

A tray can be located below the endless belt conveying surface and above the carrier; the tray providing openings for the pins to protrude through the tray.

Preferably, the conveying surface is formed by a plurality of endless belts and at least some of the plurality of pins are arranged to protrude between adjacent belts.

Preferably, the carrier comprises a plate having threaded holes, and the pins each include a shank with a threaded portion that engages into one of the threaded holes.

The preferred embodiment of the invention is effective at receiving a slice dropped from a loaf or slab to be impaled on the pins and prevented from bouncing or sliding on a conveying surface. Once the landing of the slice is fixed by the pins, the pins can be withdrawn and further slices can be stacked effectively and neatly on the properly oriented first slice.

Numerous other advantages and features of the present invention will be become readily apparent from the following detailed description of the invention and the embodiments thereof, and from the accompanying drawings.

DETAILED DESCRIPTION OF THE PREFERRED EMBODIMENTS

Figure 1:
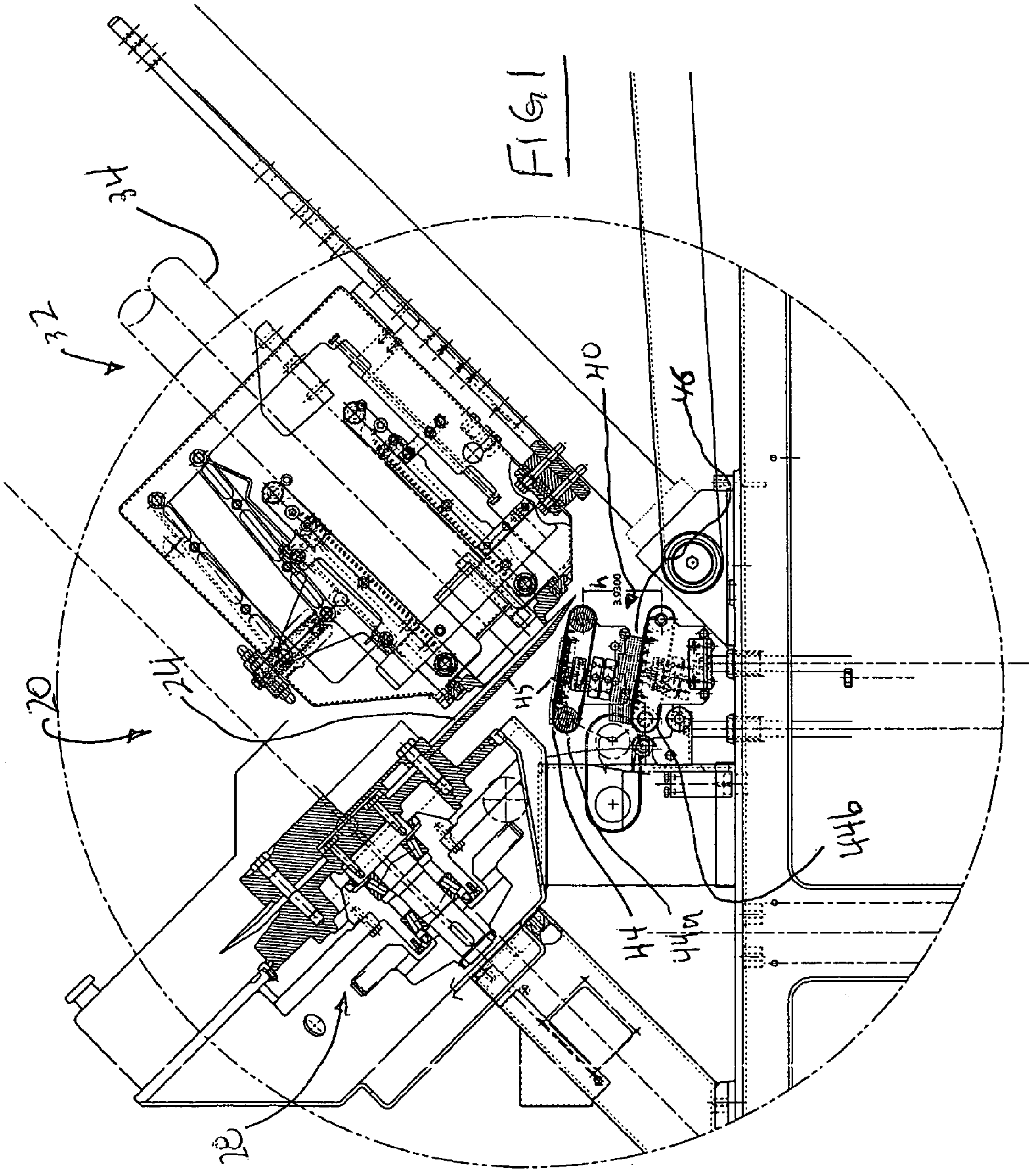
FIG. 1 is a schematical sectional view of a high-speed slicing machine.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows in cross-section a slicing machine 20 that incorporates the present invention. Such a slicing machine is disclosed for example in U.S. Pat. Nos. 5,628,237; 5,649,463; 5,704,265; and 6,484,615 herein incorporated by reference, as well as the commercially available FX-180™ and FX plus™ slicing machines available from Formax, Inc. of Mokena Ill., USA.

The slicing machine 20 includes a rotating slicing blade 24 that is driven by a slicing blade drive 28. A loaf feed the apparatus 32 controllably feeds a loaf 34 into a cutting plane defined by the rotating slicing blade 24. As slices are removed from the loaf 34, the slices drop onto a stacking conveyor 40, also known as a jump conveyor. Such jump conveyors are known and can be configured as described in U.S. Pat. Nos. 5,628,237; 5,649,463; 5,704,265; or 6,763,750, herein incorporated by reference.

The jump conveyor 40 includes an endless belt conveying surface 44 that is displaceable vertically between the elevated position 44*a* and a lowered position 44*b*. In operation, as slices 45 are removed from the loaf 34 and accumulate in a stack 46, either a straight stack or a shingled stack, on the conveying surface 44, the conveying surface 44 is progressively moved downwardly to accommodate the increasing height of the stack so that each slice falls from the loaf across a similar distance.

Figure 2:
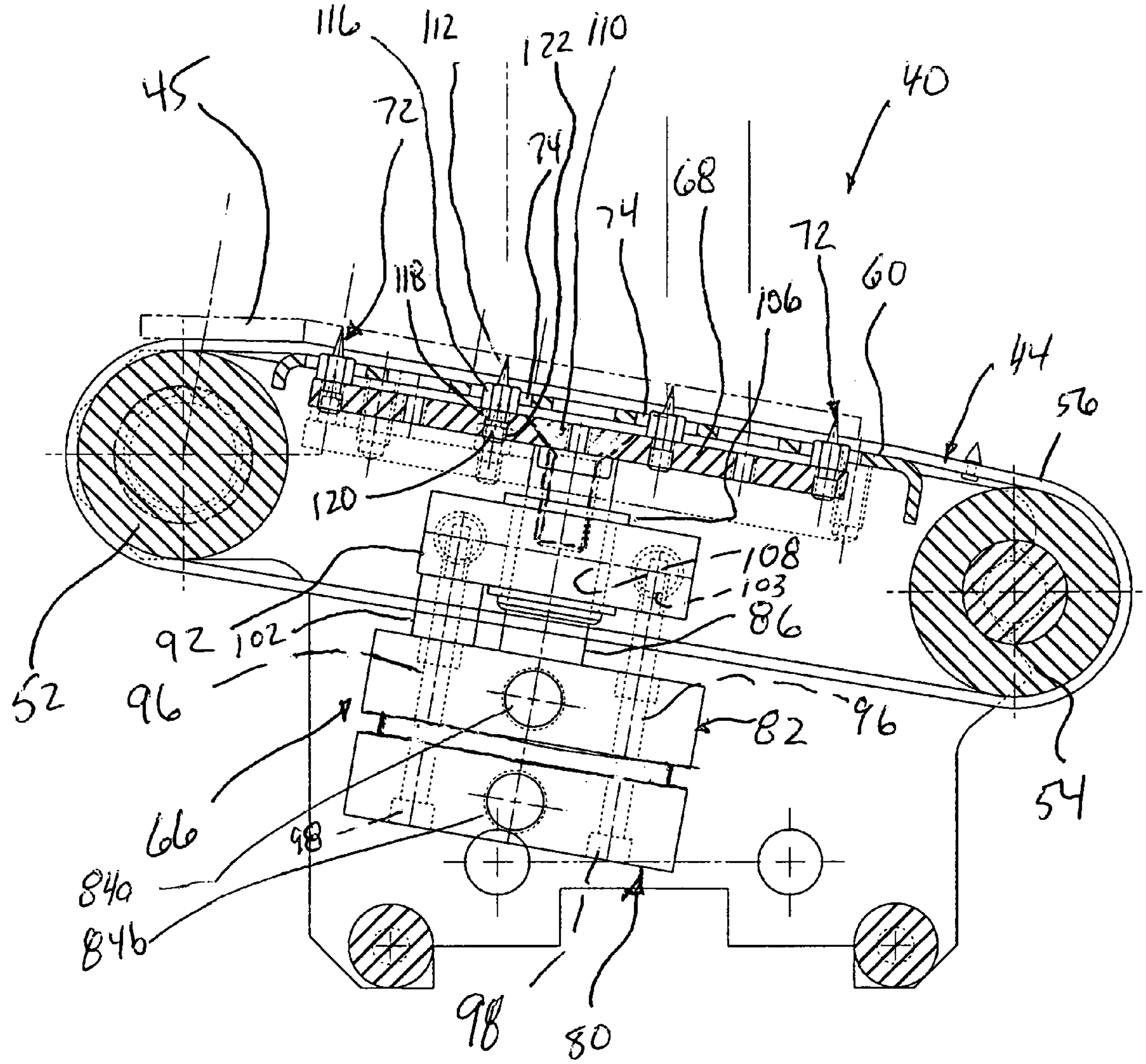
FIG. 2 is not enlarged portion of the slice machine shown in FIG. 1, and taken generally along line 2-2 of FIG. 3.

FIG. 2 illustrates an enlarged portion of FIG. 1, particularly, the configuration of the conveyor 40. The conveyor 40 includes a front roller 52 that is driven in rotation by a controlled motive means, and a rear roller 54. A plurality of spaced-apart belts 56 form the conveying surface 44. The belts 56 are wrapped around the rollers 52, 54. Beneath the belts 56 is a tray 60 that serves as a vertical support for the belts.

A pin deployment apparatus 66 is mounted beneath the tray 60. The pin deployment apparatus includes a carrier in the form of a pin plate 68 arranged in substantial parallelism with the tray 60, beneath the tray 60. The pin plate 68 carries a plurality of pins 72 which extend upwardly from the pin plate 68 through apertures 74 arranged through the tray 60. The pin plate 68 is fastened to at least one actuator, preferably linear actuators in the form of a pair of spaced-apart pneumatic cylinders 80, 81. The pneumatic cylinders 80, 81 are identical and only the pneumatic cylinder 80 will be described. The pneumatic cylinders raise and lower the pin plate 68, together.

The pneumatic cylinder 80 includes a cylinder body 82 having pneumatic ports 84*a*, 84*b* and a piston driven cylinder rod 86. The cylinder body 82 is fastened to a transverse brace bar 92 that is fastened at opposite ends thereof to side plates 94, 95 (shown in FIG. 3) of the conveyor 40. Long fasteners 96 having heads 98 extend through the cylinder body 82 through spacers 102 and are engaged into threaded holes 103 in the brace bar 92. The cylinder rod 86 passes through a bushing 106 that is fit within an opening 108 through the brace bar 92. In this way, the cylinder rod 86 can smoothly, and with reduced friction, reciprocate through the brace bar 92. Preferably, the bushing is composed of HYDEX 4101L material.

The pin plate 68 is fastened to an end of the actuator rod 86 using a single fastener 110 that has a top surface flush with the top surface of the pin plate 68. Each pin 72 is a unitary part that includes a sharp end portion 112 that merges into a hexagonal tool-engageable shoulder 116 that merges into a shank 118. The shank 118 includes a threaded portion 120 that is threaded into a threaded hole 122 in the pin plate 68. Using a wrench or similar tool from above, and gripping the shoulder 116 the pin is turned to advance the threaded portion 120 into the threaded hole 122.

The pneumatic cylinders 80, 81 are preferably of a type commercially available as from Bimba Manufacturing Company of Monee, Ill., USA, particularly a BIMBA FLAT 1, model FOS. The stroke used as preferably one quarter inch. The length of the cylinder rod is somewhat increased over standard rods.

As shown in FIG. 2, a slice 45 has been deposited onto the pins 72 with the end portions 112 penetrating into the slice to some degree. Preferably, the number of pins is sufficient such that the slice is held slightly elevated from the top surface of the belts 56. The pins 72 act to hold the slice at its initial position of deployment onto the conveyor belt 44 when dropped from the loaf during the slicing operation. At some point after they slice has been engaged by the pins 72, the cylinders 80, 81 are actuated to retract the actuating rods 86 downward to displace the pin plate 68 downward and to withdraw the pins from engagement with the slice. The slice 45 and the subsequent stack 46 are then fully supported by the conveyor belt 44 to be transported thereby by circulation of the belts.

Preferably the pins are retracted sometime after the first slice has been positioned. The pins are retracted such that the sharp portions 112 are located below the top surface of the belts 56 so as not to interfere with the movement of the formed stack 46 along the belts 56 as the roller 52 is driven into rotation to displace the formed stack off of the conveyor 40.

The brace bar 92, the tray 60, the pin plate 68, and the side plates 94, 95 are all preferably composed of 304 stainless steel.

Figure 3:
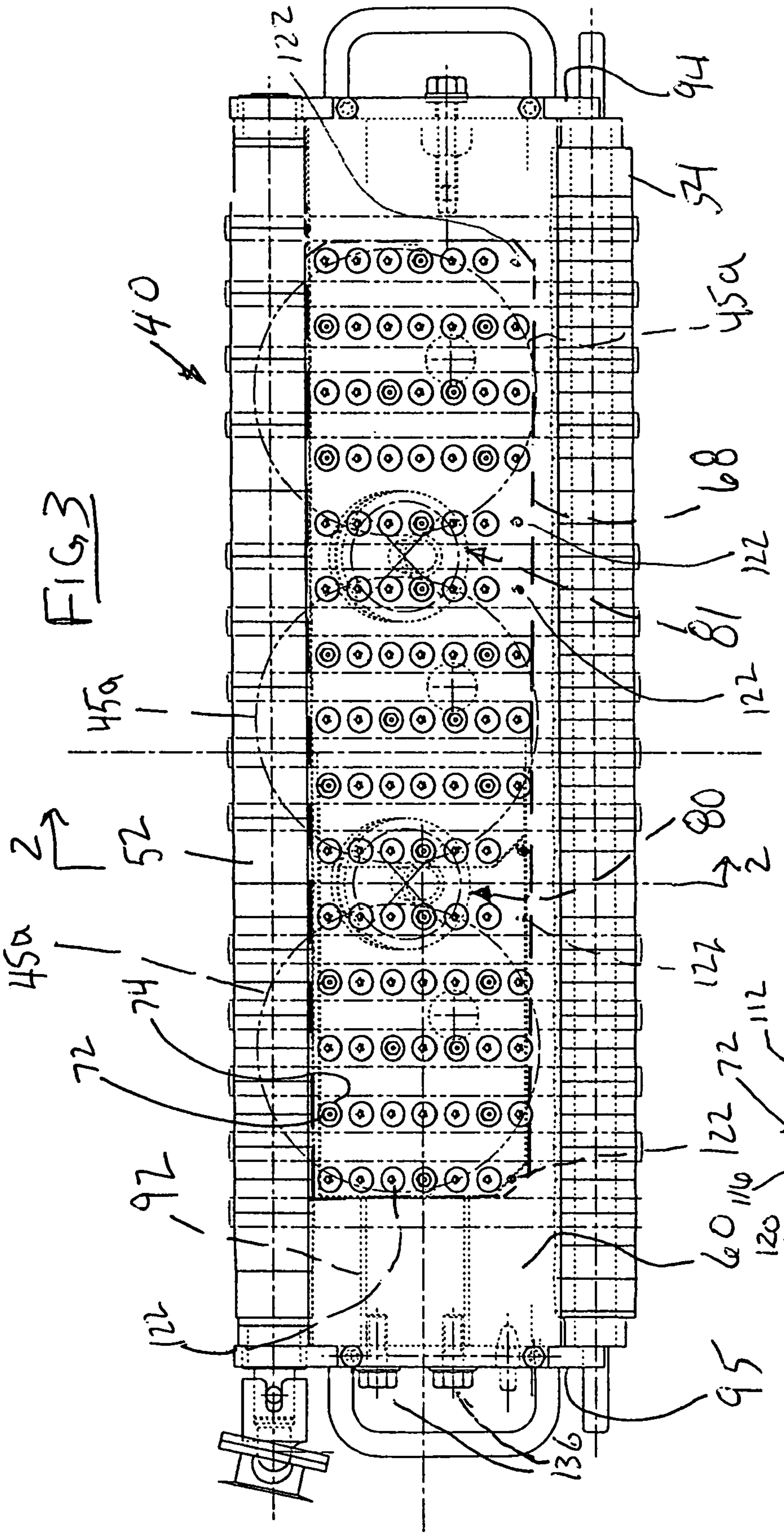
FIG. 3 is a plan view of the enlarged portion of FIG. 2.

FIG. 3 shows in plan view the conveyor 40. The brace bar 92 is fastened by two fasteners 136 to each end plate 94, 95. The rollers 52, 54 are journaled for rotation and supported by the side plates 94, 95. The pin plate 68 is shown dashed as it is beneath the tray 60. FIG. 3 illustrates the landing footprints 45*a* of slices 45 to be received by the conveyor 40. According to this illustrated arrangement, the sliced product to be stacked is 4¼ inch bologna slices.

FIG. 3 illustrates that a plurality of tray apertures 74 can be arranged in a grid pattern through the tray 60. As viewed within the apertures 74, some, but not all, of the apertures 74 have received pins 72. Furthermore, the pin plate 68 can include a greater number of threaded holes 122 than there are corresponding apertures 74. In other words, not every threaded hole 122 must include a corresponding aperture 74, and not every aperture 74 need receive a pin 72. The reason for this flexibility in numbers allows the machine to be adapted for different products of different sizes, different weights and/or different requirements. Thus, the machine can be fine-tuned by installing or removing pins 72 from the threaded holes 122. Additionally, the pin plate 68 can be provided with a universal number and rectangular grid pattern of threaded holes and the tray 60 need not have an identical number of apertures 74. This assists in manufacturing and standardization of parts and machine methods.

Figure 4:
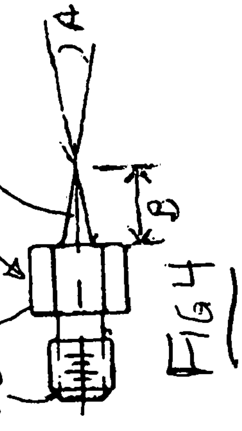
FIG. 4 is an elevational view of one pin used in the invention.

FIG. 4 illustrates one pin 72. Preferably, the pin is machined down from a hexagonal stock piece to form the shoulder portion 116. The sharp end portion 112 preferably has a sharpness angle A of about 20 degrees and a length dimension B of about 0.17 inches. The remaining dimensions are approximately to the scale shown. Preferably, the pin 72 is composed of 316 stainless steel material.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A stacking conveyor for receiving slices cut from a food loaf or slab, comprising:

a frame;

an endless belt conveying surface, supported by said frame;

said endless belt conveying surface having a first edge and a second edge defining a width of said endless belt conveying surface;

a carrier arranged beneath a top surface of said endless belt conveying surface, and at least partially within an area defined by a vertical plane extending from the first edge of said conveying surface and a vertical plane extending from the second edge of said conveying surface;

a plurality of pins for receiving slices cut from a food loaf or slab, said plurality of pints protruding upward from said carrier, each of said pins having a sharp top end; and a motive mechanism for raising said carrier to elevate said top ends of said pins above said top surface of said endless belt conveying surface.

2. The conveyor according to claim 1, wherein said motive mechanism comprises a linear actuator mounted to said frame and having a cylinder rod engaged to said carrier.

3. The conveyor according to claim 2, wherein said linear actuator is a pneumatic cylinder and a working fluid within said cylinder is air.

4. The conveyor according to claim 1, comprising a tray located below said endless belt conveying surface and above said carrier, said tray providing openings for said pins to protrude through said tray.

5. The conveyor according to claim 1, wherein said conveying surface is formed by a plurality of endless belts and at least some of said plurality of pins are arranged to protrude between adjacent belts.

6. The conveyor according to claim 5, wherein said motive mechanism comprises a pneumatic cylinder mounted to said frame and having a cylinder rod engaged to said carrier.

7. The conveyor according to claim 1, wherein said carrier comprises a plate having threaded holes, and said pins each include a shank with a threaded portion that engages into one of said threaded holes.

8. The conveyor according to claim 1, wherein said motive mechanism acts to lower said carrier.

9. The conveyor according to claim 1, wherein said carrier comprises a plate having threaded holes, and said pins each include a shank with a threaded portion that engages into one of said threaded holes, and comprising a tray located below said endless belt conveying surface and above said plate, said tray providing openings for said pins to protrude through said tray, wherein said conveying surface is formed by a plurality of spaced-apart endless belts and at least some of said plurality of pins are arranged to protrude through said tray between adjacent belts.

10. The conveyor according to claim 9, wherein said motive mechanism comprises a pneumatic cylinder mounted to said frame and having a cylinder rod engaged to said plate, wherein said pneumatic cylinder acts to raise and lower said plate.

11. In a stacking conveyor having a conveying surface for receiving slices cut from a food loaf or slab, the improvement comprising:

a plurality of pins for receiving slices cut from a food loaf or slab; each of said pins having a sharp top end;

a carrier for holding said pins; said pins protruding upward from said carrier; said carrier being sized and configured to be located at least partially under said conveying surface and configured to be movable to elevate said top ends of said pins above said conveying surface to collect said slices thereon, and to lower said top ends of said pins below the conveying surface to allow said slices to be conveyed by said conveying surface.

12. The improvement according to claim 11, comprising a motive mechanism engaged to said carrier to move said carrier between a raised and lowered position.

13. The improvement according to claim 12, wherein said motive mechanism comprises a pneumatic cylinder.

14. The improvement according to claim 11, comprising a tray sized and configured to be located below said conveying surface and above said carrier, said tray providing openings for said pins to protrude through said tray.

15. The improvement according to claim 11, wherein said conveying surface is formed by a plurality of endless belts and at least some of said plurality of pins are arranged to protrude between adjacent belts.

16. The improvement according to claim 11, wherein said carrier comprises a plate having threaded holes, and said pins each include a shank with a threaded portion that engages into one of said threaded holes.

17. The improvement according to claim 11, wherein said carrier comprises a plate having threaded holes, and said pins each include a shank with a threaded portion that engages into one of said threaded holes, and comprising a tray sized and configured to be located below said endless belt conveying surface and above said plate, said tray providing openings for said pins to protrude through said tray, wherein said conveying surface is formed by a plurality of spaced-apart endless belts and at least some of said plurality of pins are arranged to protrude through said tray between adjacent belts.

18. The improvement according to claim 17, comprising a motive mechanism engaged to said carrier to move said carrier between a raised and lowered position.

* * * * *